United States Patent
Dalfra

(10) Patent No.: US 11,169,527 B2
(45) Date of Patent: Nov. 9, 2021

(54) AUTOMATIC WORKING SYSTEM, SELF-MOVING DEVICE AND CONTROL METHOD THEREFOR

(71) Applicant: Positec Power Tools (Suzhou) Co., Ltd., Suzhou (CN)

(72) Inventor: Davide Dalfra, Villimpenta (IT)

(73) Assignee: Positec Power Tools (Suzhou) Co., Ltd., Suzhou (CN)

( * ) Notice: Subject to any disclaimer, the term of this patent is extended or adjusted under 35 U.S.C. 154(b) by 190 days.

(21) Appl. No.: 16/437,423

(22) Filed: Jun. 11, 2019

(65) Prior Publication Data

US 2019/0294168 A1     Sep. 26, 2019

Related U.S. Application Data

(63) Continuation of application No. PCT/CN2016/113253, filed on Dec. 29, 2016.

(30) Foreign Application Priority Data

Dec. 12, 2016  (CN) .......................... 201611142077.8
Dec. 19, 2016  (CN) .......................... 201611179992.4

(51) Int. Cl.
G05D 1/02     (2020.01)
G05D 1/00     (2006.01)

(52) U.S. Cl.
CPC .......... *G05D 1/0212* (2013.01); *G05D 1/0088* (2013.01); *G05D 1/02* (2013.01); *G05D 1/0259* (2013.01); *G05D 2201/0208* (2013.01)

(58) Field of Classification Search
CPC ...... G05D 1/0212; G05D 1/0088; G05D 1/02; G05D 1/0259; G05D 2201/0208
(Continued)

(56) References Cited

U.S. PATENT DOCUMENTS

2005/0010330 A1*  1/2005  Abramson ........... G05D 1/0272
                                                 700/245
2008/0039974 A1*  2/2008  Sandin ................... B60L 50/52
                                                 700/258
(Continued)

FOREIGN PATENT DOCUMENTS

CN      101636786 A      1/2010
CN      102902272 A      1/2013
(Continued)

OTHER PUBLICATIONS

State Intellectual Property Office of the P.R. China; International Search Report and Written Opinion for PCT/CN2016/113253 dated Aug. 21, 2017.

*Primary Examiner* — Yazan A Soofi
(74) *Attorney, Agent, or Firm* — Middleton Reutlinger

(57) ABSTRACT

A autonomous moving device, moving and working in a working region limited by a boundary wire, and including at least one boundary sensor, detecting boundary signal and outputting boundary signal output; a control module, electrically connected to the boundary sensor, and judging type of the boundary signal output, wherein the control module comprises an estimation unit, estimating whether the type of the boundary signal output in a predetermined estimation period is consistent or not, and if consistent, the control module judges that the boundary signal output is stable; the control module judges position relation of the boundary sensor relative to the boundary wire based on the type of the stable boundary signal output.

19 Claims, 8 Drawing Sheets

(58) Field of Classification Search
USPC .......................................................... 701/23
See application file for complete search history.

(56) References Cited

U.S. PATENT DOCUMENTS

| | | | |
|---|---|---|---|
| 2013/0211647 A1* | 8/2013 | Yamamura | G05D 1/0225 |
| | | | 701/22 |
| 2014/0012453 A1* | 1/2014 | Johnson | G05D 1/0219 |
| | | | 701/23 |
| 2016/0109241 A1* | 4/2016 | Eguchi | G01C 21/20 |
| | | | 701/23 |
| 2016/0113195 A1* | 4/2016 | Das | G05D 1/0261 |
| | | | 701/25 |
| 2016/0282870 A1* | 9/2016 | Yamamura | G05D 1/0274 |
| 2017/0108867 A1* | 4/2017 | Franzius | G05D 1/0265 |
| 2017/0351265 A1* | 12/2017 | Eagling | G05D 1/0265 |

FOREIGN PATENT DOCUMENTS

| | | |
|---|---|---|
| CN | 103869813 A | 6/2014 |
| CN | 105467982 A | 4/2016 |

* cited by examiner

AUTOMATIC WORKING SYSTEM, SELF-MOVING DEVICE AND CONTROL METHOD THEREFOR

TECHNICAL FIELD

The present invention relates to an automatic working system, an autonomous moving device, and a control method thereof.

RELATED ART

An automatic working system, for example, an automatic mower system, can automatically execute a work task without artificial regulation, and liberate users from a dull job, and thus is popular with the users day by day.

In order that the mower works in a limited working region, it is necessary that the automatic mower can recognize the working region, a common method comprises that a boundary wire is paved along the working region, a boundary signal is transmitted by the boundary wire, a boundary sensor is mounted on the automatic mower to detect the boundary signal, the output of the boundary signal output when the boundary sensor is in the working region limited by the boundary wire is different from the output of the boundary signal output when the boundary sensor is outside the working region limited by the boundary wire, and the automatic mower judges position of the boundary sensor relative to the boundary wire accordingly, and thus judges the position of the automatic mower relative to the boundary wire.

When judging that the boundary sensor is in the working region limited by the boundary wire, the controller judges that the automatic mower is in the working region, and controls the automatic mower to move and mow. When judging that the boundary sensor is outside the working region limited by the boundary wire, the controller controls the automatic mower to steer to make the automatic mower return back into the working region.

SUMMARY

The boundary signal output outputted from the boundary sensor may be affected by an interference signal, which possibly comes from a working environment of the automatic mower, for example, the interference signal generated by the boundary wire of an adjacent working system, the interference signal also possibly comes from the automatic mower per se, for example, the interference signal generated by a motor, etc. When the boundary signal output from the boundary sensor is affected by the interference signal, the change of the boundary signal output may be similar to the change of the boundary signal output when the boundary sensor in/outside the working region is changed to be outside/in the working region, and the controller cannot accurately distinguish that the change of the boundary signal output is caused by wire crossing of the automatic mower over the boundary wire or an influence of the interference signal. That is to say, the controller may misjudge the change happening when the boundary signal output is affected by the interference signal into the change of the boundary signal output caused by the change of a position relation of the boundary sensor relative to the boundary wire, and accordingly controls the automatic mower to change a moving manner. Except for the influence of the interference signal, the causes of an algorithm, etc., may also lead to the misjudgment of the controller on the change of the boundary signal output, which causes the misjudgment on a position change of the boundary sensor.

The misjudgment on a position change of the boundary sensor will affect working stability of the automatic mower. Therefore, an urgent problem to be solved in prior art is how to accurately judge the position change of the boundary sensor relative to the boundary wire, such that the position change of the automatic mower relative to the boundary wire can be accurately judged, the change of the boundary signal output when the automatic mower crosses the boundary wire is distinguished from the change of the boundary signal output caused by the interference signal and the like, and the change of the boundary signal output caused by the interference signal and the like is filtered.

In order to solve the above problem, the embodiments of the present invention aim to provide a technical solution.

A autonomous moving device, moving and working in a working region limited by a boundary wire, comprising: at least one boundary sensor, configured to detect boundary signal and output boundary signal output; a control module, electrically connected to the boundary sensor, configured to judge type of the boundary signal output outputted by the boundary sensor; and the control module comprises an estimation unit, configured to estimate whether the type of the boundary signal output outputted by the boundary sensor in a predetermined estimation period is consistent or not, and if consistent, the control module judges that the boundary signal output is stable; the control module judges position relation of the boundary sensor relative to the boundary wire based on the type of the stable boundary signal.

In one of the embodiments, if the type of the boundary signal output outputted by the boundary sensor in the predetermined estimation period is inconsistent, the control module judges that the boundary signal output is instable, and makes the estimation unit reestimate.

In one of the embodiments, the predetermined estimation period is stopped after preset estimation time is up.

In one of the embodiments, the predetermined estimation period is stopped after the boundary sensor outputs a predetermined number of boundary signal output.

In one of the embodiments, the estimation unit is configured to estimate whether the type of the boundary signal output outputted by the boundary sensor in the predetermined estimation period is same or not, and if same, the control module judges that the boundary signal output is consistent.

In one of the embodiments, the control module triggers the estimation unit to begin to estimate when judging that the type of the boundary signal output outputted by the boundary sensor is changed.

In one of the embodiments, the types of the boundary signal output comprise inside signal, or outside signal, or unknown signal, or non signal, wherein the inside signal indicates that the boundary sensor is located in the working region limited by the boundary wire, the outside signal indicates that the boundary sensor is located outside the working region limited by the boundary wire, and the unknown signal indicates that a position relation of the boundary sensor relative to the boundary wire is unknown.

In one of the embodiments, the autonomous moving device comprises a moving module, electrically connected to the control module, configured to drive the autonomous moving device to move and steer; the control module controls the moving module to drive the autonomous moving device to move forwards when judging that the type of the stable boundary signal output is inside signal.

In one of the embodiments, the autonomous moving device comprises a moving module, electrically connected to the control module, configured to drive the autonomous moving device to move and steer; the control module controls the moving module to drive the autonomous moving device to steer when judging that the type of the stable boundary signal output is outside signal.

In one of the embodiments, when judging that the type of the stable boundary signal output is unknown signal or non signal, the control module controls the autonomous moving device to stop moving.

In one of the embodiments, when the type the boundary signal output estimated by the estimation unit is non signal or unknown signal, the predetermined estimation period is longer than the predetermined estimation period when the type the boundary signal output estimated by the estimation unit is inside signal or outside signal.

In one of the embodiments, the autonomous moving device comprises a returning mode, under the returning mode, the control module controls the autonomous moving device to move along the boundary wire; under the returning mode, the predetermined estimation period of the estimation unit is shorter than the predetermined estimation period when the autonomous moving device moves in the working region limited by the boundary wire.

In one of the embodiments, if judging that the estimation unit is not triggered to begin to estimate in a predetermined waiting period, the control module controls the autonomous moving device to stop moving.

In one of the embodiments, the predetermined waiting period is stopped after the autonomous moving device moves for a preset distance.

In one of the embodiments, the estimation unit is configured to estimate position relation of the boundary sensor relative to the boundary wire when the autonomous moving device is started.

In one of the embodiments, when the autonomous moving device is started, in the predetermined estimation period, the control module controls the autonomous moving module to not move and not work.

In one of the embodiments, the autonomous moving device comprises a returning mode, under the returning mode, the control module controls the autonomous moving device to move along the boundary wire; for the autonomous moving device, under the returning mode or in a working process, in the predetermined estimation period, the control module controls the autonomous moving device to move or work according to a status before the estimation unit begins to estimate.

In one of the embodiments, the estimation unit is configured to estimate whether position relation of the boundary sensor relative to the boundary wire is changed.

An automatic working system, comprising a boundary wire, transmitting boundary signal; and the autonomous moving device according to any one of the above.

A control method of a autonomous moving device which moves and works in a working region limited by a boundary wire, comprising the steps: detecting boundary signal, and outputting boundary signal output; judging type of the boundary signal output; estimating whether the type of the boundary signal output in a predetermined estimation period is consistent or not, if consistent, judging that the boundary signal output is stable; judging position relation of the autonomous moving device relative to the boundary wire based on the type of the stable boundary signal output.

In one of the embodiments, estimating whether the type of the boundary signal output in the predetermined estimation period is consistent or not, and if not consistent, judging the boundary signal output is instable, and repeating the estimating step.

In one of the embodiments, the predetermined estimation period is stopped after the preset estimation time is up.

In one of the embodiments, the predetermined estimation period is stopped after a predetermined number of the boundary signal output is outputted.

In one of the embodiments, estimating whether the type the boundary signal output is same or not in the predetermined estimation period, and if same, judging the boundary signal output is consistent.

In one of the embodiments, the estimating step is triggered when the type of the boundary signal output is judged to be changed.

In one of the embodiments, the types of the boundary signal output comprise inside signal, or outside signal, or unknown signal, or non signal, wherein the inside signal indicates that the autonomous moving device is located in the working region limited by the boundary wire, outside signal indicates that the autonomous moving device is located outside the working region limited by the boundary wire, and the unknown signal indicates that position relation of the autonomous moving device relative to the boundary wire is unknown.

In one of the embodiments, controlling the autonomous moving device to move forwards when judging the type of the stable boundary signal output is inside signal.

In one of the embodiments, controlling the autonomous moving device to steer when judging the type of the stable boundary signal is outside signal.

In one of the embodiments, controlling the autonomous moving device to stop moving when judging the type of the stable boundary signal output is unknown signal or non signal.

In one of the embodiments, when the type of the boundary signal output estimated is unknown signal or non signal, the predetermined estimation period is longer than the predetermined estimation period when the type of the boundary signal output estimated is inside signal or outside signal.

In one of the embodiments, the autonomous moving device comprises a returning mode, under the returning mode, controlling the autonomous moving device to move along the boundary wire; under the returning mode, the predetermined estimation period is shorter than the predetermined estimation period when controlling the autonomous moving device moving in the working region limited by the boundary wire.

In one of the embodiments, controlling the autonomous moving device to stop moving when judging no estimating triggered in a predetermined waiting period.

In one of the embodiments, the predetermined waiting period is stopped after the autonomous moving device moves for a preset distance.

In one of the embodiments, the estimating step is used for estimating position relation of the autonomous moving device relative to the boundary wire when the autonomous moving device is started.

In one of the embodiments, controlling the autonomous moving device not to move or work in the predetermined estimation period when the autonomous moving device is started.

In one of the embodiments, the autonomous moving device comprises a returning mode, under the returning mode, controlling the autonomous moving device to move along the boundary wire; for the autonomous moving device, under the returning mode or in a working process, in the predetermined estimation period, controlling the autonomous moving device to move or work according to a status before the estimating.

In one of the embodiments, the estimating step is used for estimating whether position relation of the autonomous moving device relative to the boundary wire is changed.

The embodiments of the present invention have the beneficial effects: a position relation of the boundary sensor relative to the boundary wire can be accurately judged, misjudgment caused by the interference signal and the like can be avoided, and an automatic working system works stably.

BRIEF DESCRIPTION OF THE DRAWINGS

The technical problem solved by the embodiments of the present invention, the technical solution and the beneficial effects can be clearly obtained by the detailed description on following specific embodiments capable of realizing the present invention in combination with the drawings.

| 100. Automatic working system | 1. Automatic mower | 2. Charging station |
|---|---|---|
| 3. Signal station | 5. Boundary wire | 7, 8. Boundary sensor |
| 9. Shell | 11. Wheel set | 13. Cutting component |
| 15. Isolation island | 17. First part of returned portion of boundary wire | |
| 19. Second part of returned portion of boundary wire | | |

DETAILED DESCRIPTION

Figure 1:
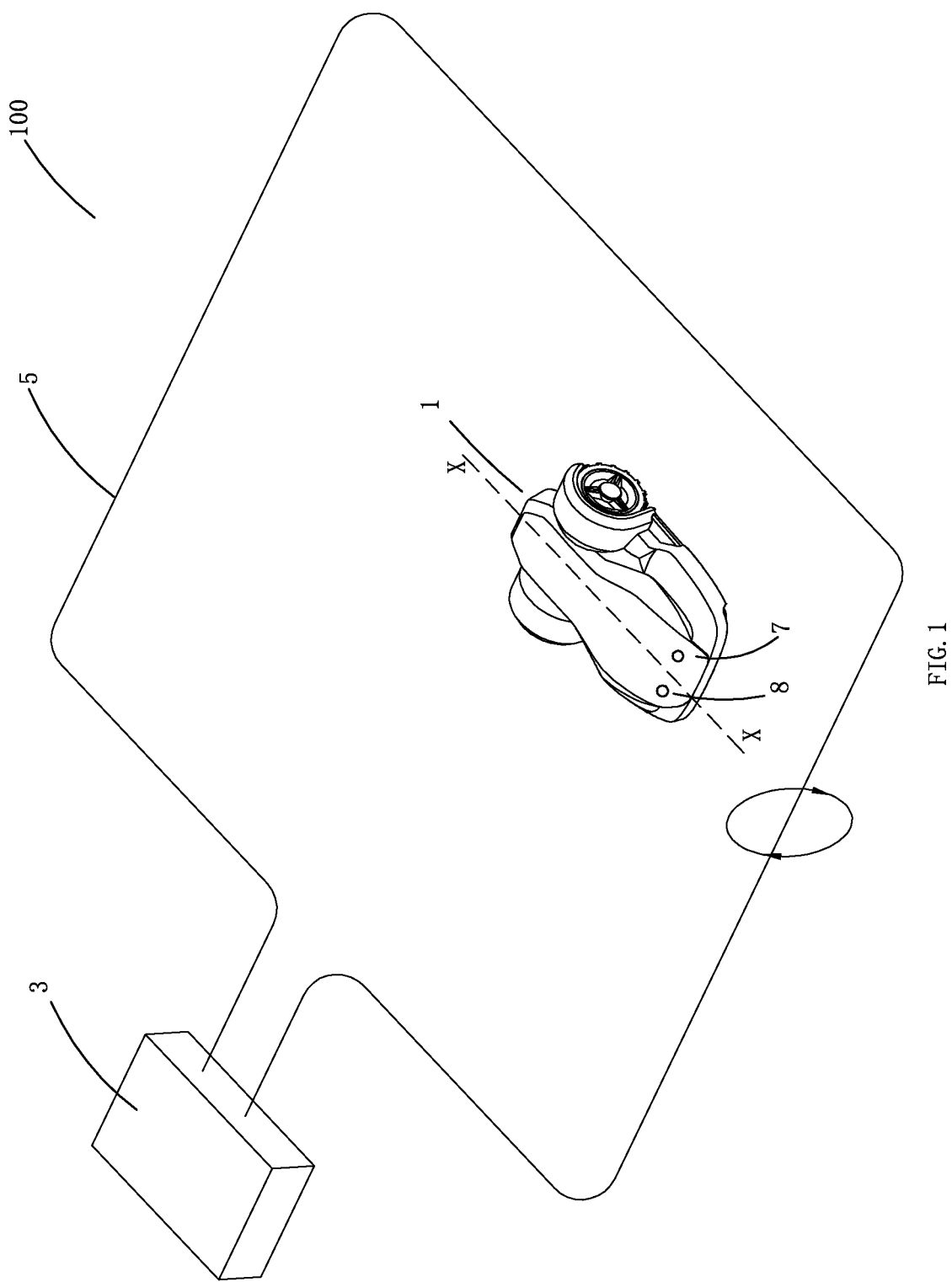
FIG. 1 is a schematic diagram of an automatic working system of a first embodiment of the present invention.

FIG. 1 is a schematic diagram of an automatic working system 100 of a first embodiment of the present invention. The automatic working system 100 comprises a boundary wire 5, a signal generator 3 and an autonomous moving device 1. The boundary wire 5 is paved along a boundary of the working region, and limits a working region of the autonomous moving device, of course, the boundary wire can also be paved along an obstacle, an isolation island and the like in the working region to prevent the autonomous moving device from entering the above region. The signal generator 3 is electrically connected to the boundary wire 5 and generates boundary signal and the boundary wire 5 transmits the boundary signal. In the present embodiment, the boundary signal generated by the signal generator 3 is variable electric signal, specifically, the boundary signal generated by the signal generator 3 is pulse signal, and in other embodiments, the boundary signal can also be signal of other forms. The boundary signal transmitted by the boundary wire 5 generates an electromagnetic field in space. In the present embodiment, the autonomous moving device is an automatic mower 1, and in other embodiments, the autonomous moving device can be an unattended device such as an automatic dust collector, an automatic snow sweeper, an automatic irrigator, and the like.

Figure 2:
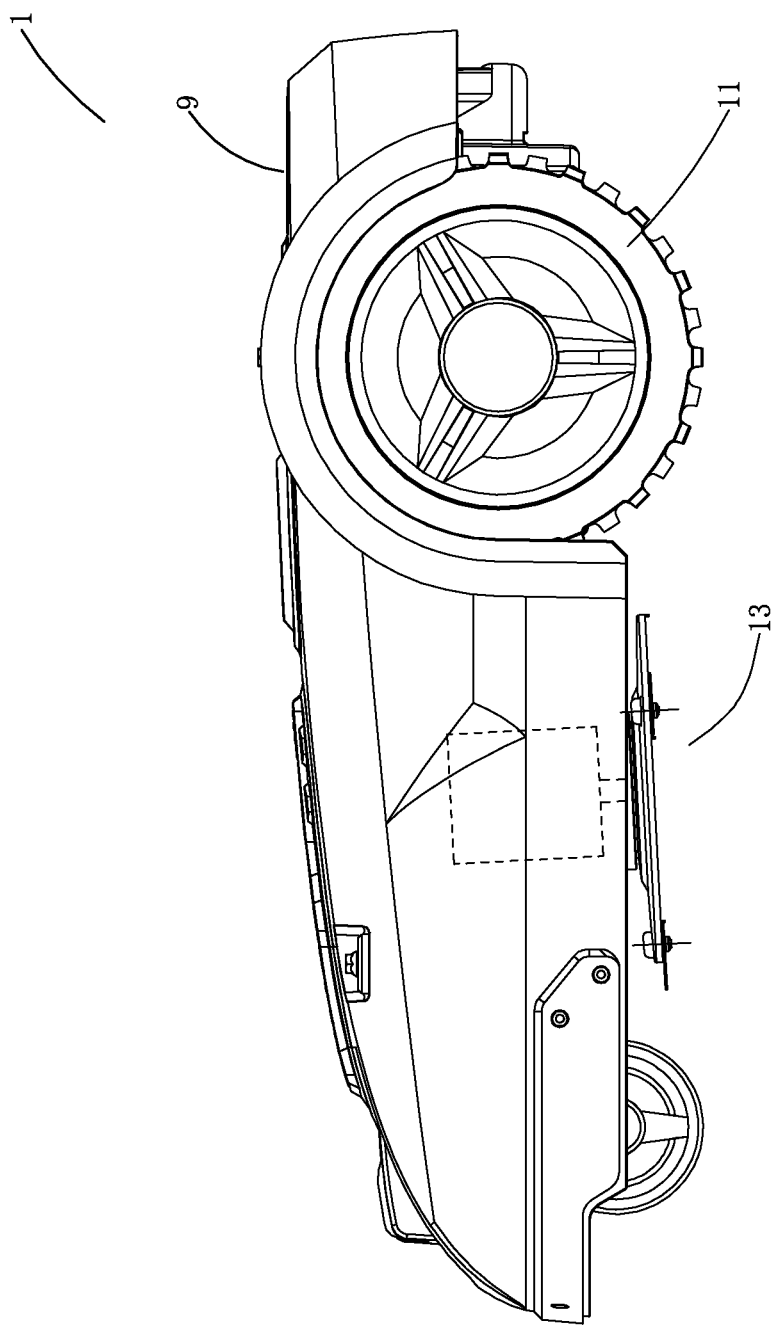
FIG. 2 is a structural diagram of an automatic mower of the first embodiment of the present invention.

FIG. 2 is a structural diagram of the automatic mower 1 of a first embodiment of the present invention, the automatic mower 1 comprises a shell 9, a moving module, a task executing module, an energy module, and a control module, etc. By combining FIGS. 1 and 2, the shell 9 has a longitudinal axis X-X, and the moving module, the task executing module, the energy module and the control module are mounted in the shell 9. The moving module comprises a wheel set 11, which is driven by a drive motor/drive motors to drive the automatic mower 1 to move and steer. The task executing module comprises a cutting component 13, which is driven by a cutting motor to rotate to execute mowing work. The energy module comprises a battery pack/battery packs (not shown), which provides energy for moving and working of the automatic mower 1. The control module is electrically connected to the moving module and the task executing module to control the moving module to drive the automatic mower 1 to move, and control the task executing module to execute the mowing work. In the present embodiment, the automatic mower 1 comprises at least one boundary sensor 7 or 8, which is electrically connected to the control module, the boundary sensor 7 or 8 detects boundary signal, specifically, the boundary sensor 7 or 8 detects the electromagnetic field generated by the boundary signal transmitted by the boundary wire 5 in space, and outputs boundary signal output. In the present embodiment, the automatic mower 1 comprises two boundary sensors 7 and 8, which are disposed at the front part of the shell 9 and are symmetric about the longitudinal axis of the shell 9.

Figure 7:
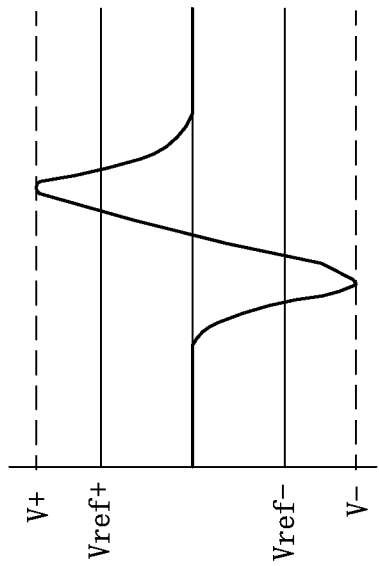
FIGS. 7(a) and 7(b) are waveform diagrams of boundary signal output outputted from a boundary sensor of the first embodiment of the present invention.
Figure 7:
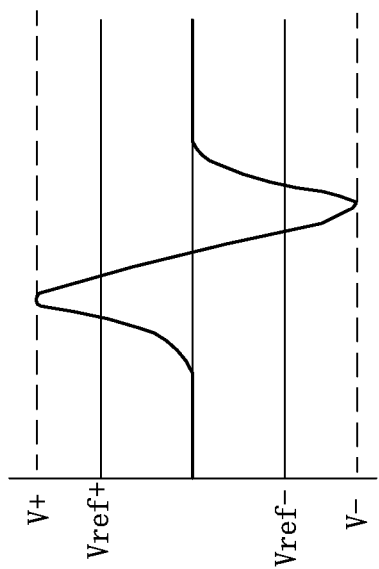

In the present embodiment, the output of the boundary signal output from the boundary sensors 7 and 8 comprises different types. Specifically, the types of the boundary signal output comprise inside signal, outside signal, unknown signal, non signal, etc. In the present embodiment, the boundary signal generated by the signal generator 3 is pulse signal, under an ideal condition, when the boundary sensors 7 and 8 are located in the working region limited by the boundary wire and when the boundary sensors 7 and 8 are located outside the working region limited by the boundary wire, the waveforms of the boundary signal output outputted from the boundary sensors 7 and 8 are as shown in FIGS. 7(a) and 7(b) respectively. As shown in FIG. 7(a), the boundary signal output outputted from the boundary sensors 7 and 8 comprises a wave crest that an amplitude value V+ is larger than a threshold value Vref+ and a wave trough that an amplitude value V− is smaller than a threshold value Vref−, the wave crest is located in front of the wave trough, the wave crest and the wave trough respectively correspond to a rising edge and a falling edge of the pulse signal. The control module processes and analyzes the boundary signal output as shown in FIG. 7(a), and judges that the boundary signal output outputted from the boundary sensors 7 and 8 is inside signal. As shown in FIG. 7(b), the boundary signal output outputted from the boundary sensors 7 and 8 comprises a wave trough that an amplitude value V− is smaller than a threshold value Vref− and a wave crest that an amplitude value V+ is larger than a threshold value Vref+, since the electromagnetic field detected by the boundary sensors 7 and 8 when the boundary sensors 7 and 8 are located outside the working region limited by the boundary wire and when the boundary sensors 7 and 8 are located in the working region limited by the boundary wire are opposite in direction, the wave trough is located in front of the wave crest, the wave trough and the wave crest respectively correspond to a rising edge and a falling edge of the pulse signal. The control module processes and analyzes the boundary signal output as shown in FIG. 7(*b*), and judges that the boundary signal output outputted from the boundary sensors 7 and 8 is outside signal. In a certain condition, the boundary signal output outputted from the boundary sensors 7 and 8 comprises the wave crest that an amplitude value V+ is larger than a threshold value Vref+ or the wave trough that an amplitude value V− is smaller than a threshold value Vref−, but does not have a form as shown in FIG. 7(*a*) or 7(*b*), then the control module judges that the boundary signal output outputted from the boundary sensors 7 and 8 is unknown signal, and the control module cannot judge a position relation of the boundary sensors 7 and 8 relative to the boundary wire based on unknown signal. This condition may be caused by the fact that the output of the boundary signal output from the boundary sensors 7 and 8 is affected by an interference signal. Under a certain condition, the boundary signal output outputted from the boundary sensors 7 and 8 does not comprise the wave crest that an amplitude value V+ is larger than a threshold value Vref+ or the wave trough that an amplitude value V− is smaller than a threshold value Vref−, then the control module judges the boundary signal output as non signal. This condition may be caused when the automatic mower is too far away from the boundary wire or the boundary wire is broken. Of course, in the present embodiment, the boundary signal has a certain pulse width, therefore, a time interval between the rising edge and the falling edge can also serve as a judgment criterion for the type of the boundary signal output. For example, under a certain condition, when the time interval between the wave crest and the wave trough is plural or dozens time of a period between adjacent pulses happen, then the type of the boundary signal output outputted from the boundary sensors 7 and 8 is judged to be non signal or unknown signal.

In the present embodiment, the control module comprises an estimation unit, estimating whether the type of the boundary signal output outputted from the boundary sensors 7 and 8 is consistent in a predetermined estimation period, if consistent, then the control module judges that the boundary signal output outputted from the boundary sensors 7 and 8 is stable. The estimation unit may be any means in either hardware, software, or a combination of hardware and software which is configured to perform corresponding functions. In the present embodiment, the estimation unit can be realized by an algorithm rather than an entity. In the present embodiment, the estimation unit estimates whether the types of the boundary signal output from the boundary sensors 7 and 8 are same in a predetermined estimation period, if same, the control module judges that the type of the boundary signal output outputted from the boundary sensors 7 and 8 is consistent. If judging that the output of the boundary signal output from the boundary sensors 7 and 8 is stable, the control module judges a position relation of the boundary sensors 7 and 8 relative to the boundary wire 5 based on the type of the stable boundary signal output, and controls a moving manner of the automatic mower 1 accordingly.

In the present embodiment, the predetermined estimation period is stopped after preset estimation time is up. Specifically, the estimation unit comprises a timer, the timer begins to time when the estimation unit begins to estimate, and the estimation unit finishes estimation when the timer times to the preset estimation time.

In the present embodiment, when the control module judges that the type of the boundary signal output outputted from the boundary sensors 7 and 8 is changed, the estimation unit is triggered to begin to estimate.

The change of the type of the boundary signal output comprises a change between non signal and the opposite. For example, after the automatic mower 1 is started, the control module judges there's a boundary signal output outputted from the boundary sensors 7 and 8, the estimation unit is triggered to begin to estimate. The change of the type of boundary signal output also comprises change from one of inside signal, outside signal or unknown signal to another of inside signal, outside signal or unknown signal. For example, in a moving and working process of the automatic mower 1, when the automatic mower crossing the boundary wire 5, the boundary signal output outputted from the boundary sensors 7 and 8 changes into outside signal from inside signal, the control module triggers the estimation unit to begin to estimate. Or, when the boundary signal output outputted from the boundary sensors 7 and 8 is affected by the interference signal, the type of the boundary signal output changes as mentioned above, the control module triggers the estimation unit to begin to estimate.

Figure 3:
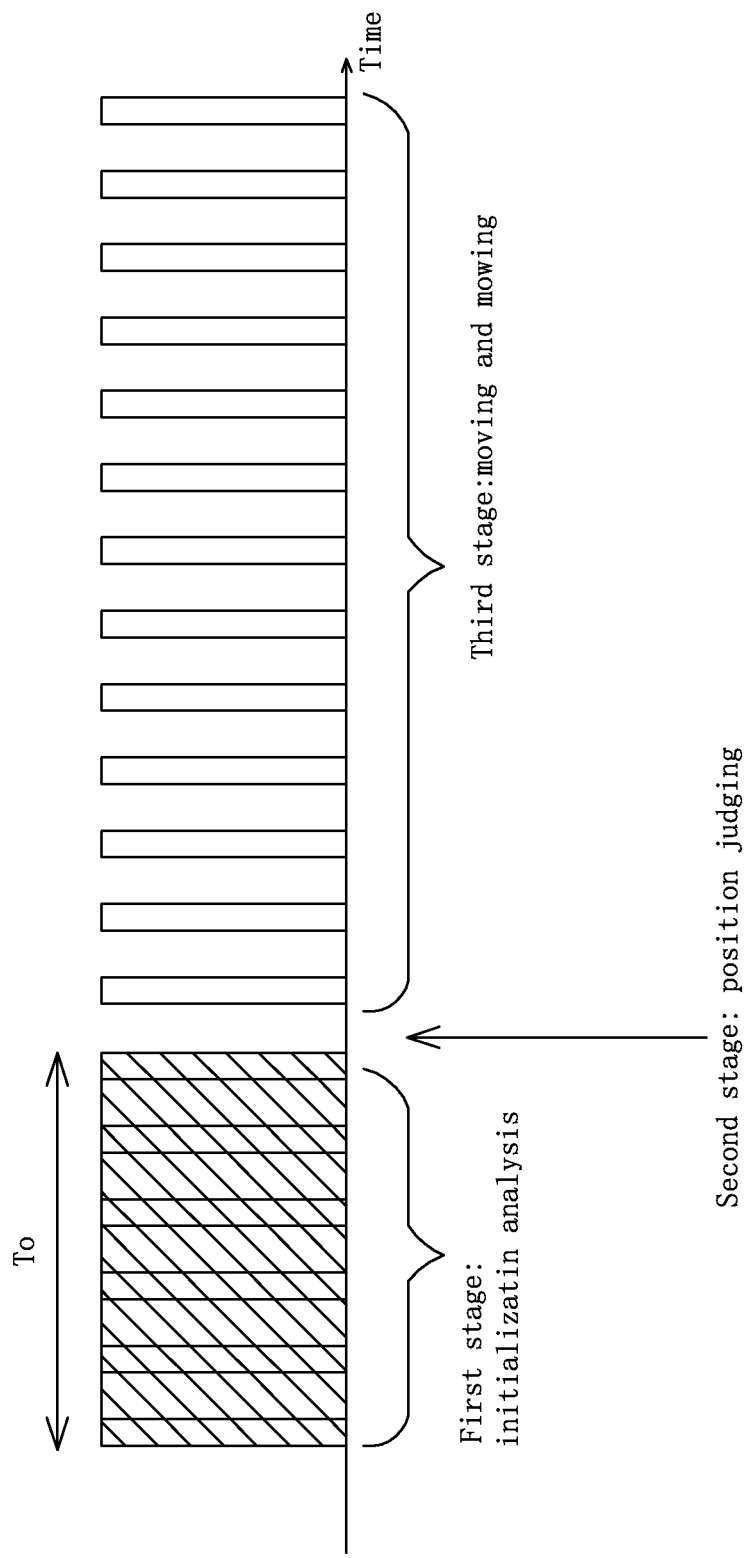
FIGS. 3-4 are schematic diagrams of a time sequence of boundary signal output of the first embodiment of the present invention.
Figure 4:
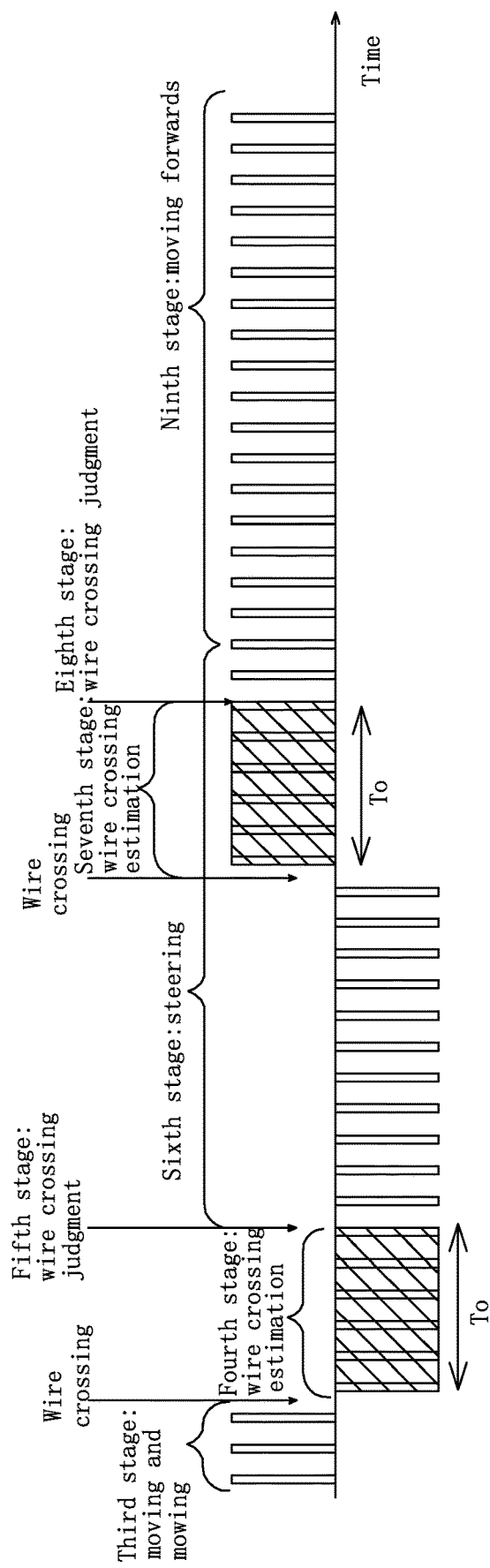

A schematic diagram of a time sequence of boundary signal output as shown in FIGS. 3-4 is taken as an example for explaining an estimation process of the estimation unit in the present embodiment.

The pulse in the FIGS. 3-4 represents the output of the boundary signal output after processed and analyzed by the control module, a positive pulse in the drawings represents the inside signal and a negative pulse represents the outside signal. In the present embodiment, the automatic mower 1 is located in the working region limited by the boundary wire when starting, therefore, after the automatic mower 1 is started, the boundary sensors 7 and 8 output the inside signal. When the control module judges there's a boundary signal output outputted from the boundary sensors 7 and 8, the estimation unit is triggered to begin to estimate, and the timer begins to time. At this point, the automatic mower 1 does not move or execute the mowing work, therefore, the type of the boundary signal output outputted from the boundary sensors 7 and 8 is always the inside signal, when the timer times to the preset estimation time $T_0$, the estimation unit finishes the estimation. The above process corresponds to a first stage: initialization analysis in the FIG. 3. When the estimation unit finishes the estimation, the control module judges that the boundary signal output outputted from the boundary sensors 7 and 8 is a stable inside signal, and thus judges that the boundary sensors 7 and 8 are located in the working region limited by the boundary wire, the control module will control the moving module to begin to drive the automatic mower 1 to move forwards, and control the task executing module to begin to execute the mowing work. This process corresponds to a second stage: position judging in FIG. 3. As shown in FIG. 3, afterwards, the automatic mower 1 is in a state of moving and mowing, i.e., the third stage.

When the automatic mower moves in the working region, the type of the boundary signal output outputted from the boundary sensors 7 and 8 is unchanged, and the estimation unit performs no estimation.

Figure 5:
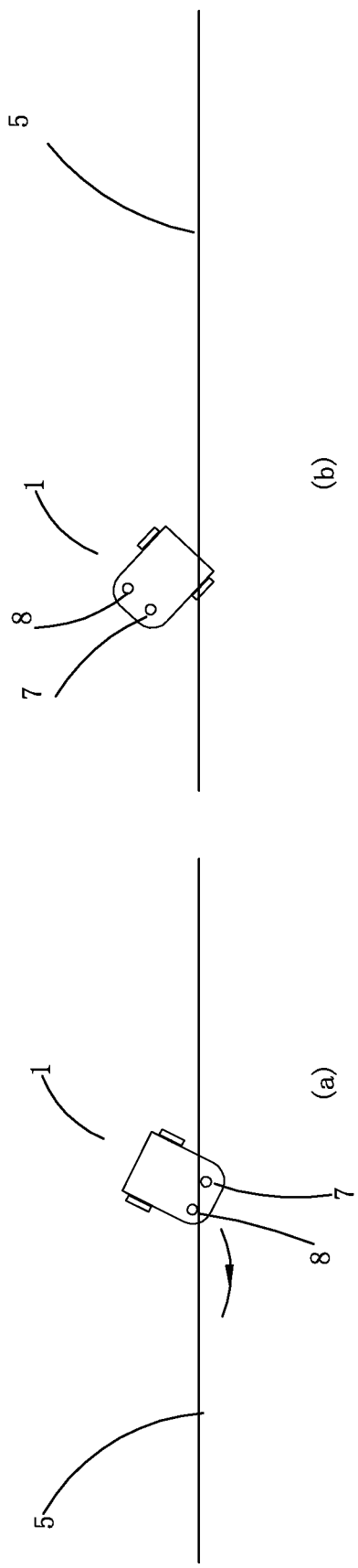
FIGS. 5(a) and 5(b) are schematic diagrams of a moving manner when the automatic mower of the first embodiment of the present invention meets a boundary wire.

In combination with FIGS. 4 and 5(*a*), in the working process, the automatic mower 1 moves to the boundary wire 5 from the working region, and when the automatic mower 1 continues to move, the boundary sensor 7 located in the front of the shell 9 of the automatic mower 1 will move outside the working region. At this point, the type of the boundary signal output outputted from the boundary sensor 7 changes into the outside signal. The control module judges that the type of the boundary signal output outputted from the boundary sensor 7 is changed, the estimation unit is triggered to begin to estimate, and the timer begins to time. Before the estimation unit finishes the estimation, the control module judges that a position relation of the boundary sensor 7 relative to the boundary wire 5 is not changed, that is to say, the control module considers that the boundary sensor 7 is still located in the working region limited by the boundary wire 5, and the control module controls the automatic mower 1 to continue to move and execute the mowing work. Therefore, the boundary sensor 7 continues to be located outside the working region, and the type of the boundary signal output outputted from the boundary sensor 7 is always the outside signal. That is to say, there's no new change of the type of the boundary signal output to interrupt the estimation process. Therefore, when the timer times to the preset estimation time $T_0$, the estimation unit finishes the estimation. The above process corresponds to a fourth stage: wire crossing estimation in FIG. 4. When the estimation unit finishes the estimation, the control module judges that the boundary signal output outputted from the boundary sensor 7 is a stable outside signal, and thus judges that the boundary sensor 7 is located outside the working region. That is to say, the control module judges that a position relation of the boundary sensor 7 relative to the boundary wire 5 is changed, and the control module judges that the automatic mower 1 crosses the boundary wire 5. At this point, the control module begins to control the moving module to drive the automatic mower 1 to steer to get away from the boundary wire 5, and the above process corresponds to a fifth stage: wire crossing judgment in FIG. 4. As shown in FIG. 4, afterwards, the automatic mower 1 is still in a steering state, i.e., a sixth stage.

When the automatic mower 1 starts to steer, the boundary sensor 7 is still located outside the working region, the type of the boundary signal output is unchanged and the estimation unit performs no estimation.

In combination with FIGS. 4 and 5(b), in the steering process of the automatic mower 1, when the boundary sensor 7 moves into the working region from a position outside the working region, the type of the boundary signal output outputted from the boundary sensor 7 changes from the outside signal to the inside signal, the control module judges that the type of the boundary signal output is changed, the estimation unit is triggered to begin to estimate, and the timer begins to time. Before the estimation unit finishes the estimation, the control module judges that a position relation of the boundary sensor 7 relative to the boundary wire is unchanged, that is to say, the control module considers that the boundary sensor 7 is still located outside the working region limited by the boundary wire, the control module controls the automatic mower 1 to continue to steer, and the type of the boundary signal output outputted from the boundary sensor 7 is always the inside signal. When the timer times to the preset estimation time $T_0$, the estimation unit finishes the estimation. This process corresponds to a seventh stage: wire crossing estimation in FIG. 4. When the estimation unit finishes the estimation, the control module judges that the boundary signal output outputted from the boundary sensor 7 is stable inside signal, and thus judges that the boundary sensor 7 is located in the working region, that is, an eighth stage: wire crossing judgment. When judging that the boundary sensor 7 returns back to the working region again, the control module controls the automatic mower 1 to move forwards to enter a ninth stage. The automatic mower 1 moves and executes the mowing work till meeting the boundary wire 5 again, and the above process is repeated.

In the present embodiment, when the automatic mower 1 moves in the working region, if the type of the boundary signal output is changed due to an interference signal, the control module triggers the estimation unit to begin to estimate, and the timer begins to time. Before the timer times to the preset estimation time $T_0$, the interference signal disappears or is changed, causing that the type of the boundary signal output changes again, and then the control module judges that the boundary signal output is instable, the estimation unit is triggered to begin to reestimate. Before the estimation unit finishes the estimation, the control module judges that a position relation of the boundary sensor 7 or 8 relative to the boundary wire 5 is unchanged, therefore, controls the automatic mower 1 to continue to move forwards. If the automatic mower 1 is still kept in the working region, then in the reestimated preset estimation time $T_0$, the type of the boundary signal output is always the inside signal, the control module judges that the boundary signal output is stable inside signal, and thus judges that the boundary sensor 7 or 8 is located in the working region. In this way, by performing delay judgment on the change of the type of the boundary signal output, the influence of the interference signal is effectively filtered.

In the present embodiment, when the type of the boundary signal output outputted from the boundary sensor 7 or 8 is changed, the control module uses the estimation unit to estimate rather than immediately judging that the position relation of the boundary sensor 7 or 8 relative to the boundary wire 5 is changed, the control module judges whether the type of the boundary signal output in the preset estimation time is consistent, if consistent, then judges that the position relation of the boundary sensor 7 or 8 relative to the boundary wire 5 is changed, thus changes the moving manner of the automatic mower 1. In this way, misjudgment of position change of the boundary sensor 7 or 8 judged by the control module due to bounce of the boundary signal output caused by interference signal, i.e. a temporary change of the boundary signal output, is effectively prevented, such that the working stability of the automatic mower 1 is ensured.

In the present embodiment, a range of the preset estimation time may be 40-250 ms.

The present estimation time is related to the type of the boundary signal output outputted from the boundary sensor 7 or 8. When the control module judges that the type of the boundary signal output is changed to the inside signal or the outside signal, the range of the present estimation time is 40-100 ms. When the control module judges that the type of the boundary signal output is changed to non signal or unknown signal, the preset estimation time is prolonged, and the range of the present estimation time is 100-250 ms. If the type of the boundary signal output outputted from the boundary sensor 7 or 8 is all non signal or unknown signal in the preset estimation time, the automatic mower 1 is controlled to stop moving and mowing. When the type of the boundary signal output outputted from the boundary sensor 7 or 8 continues to be non signal or unknown signal, the control module cannot judge a position relation of the boundary sensor 7 or 8 relative to the boundary wire 5, therefore, in order to ensure the safety of the automatic working system 100, the automatic mower 1 is controlled to stop moving and mowing.

In the present embodiment, the preset estimation time is related to a working mode of the automatic working system 100.

Figure 8:
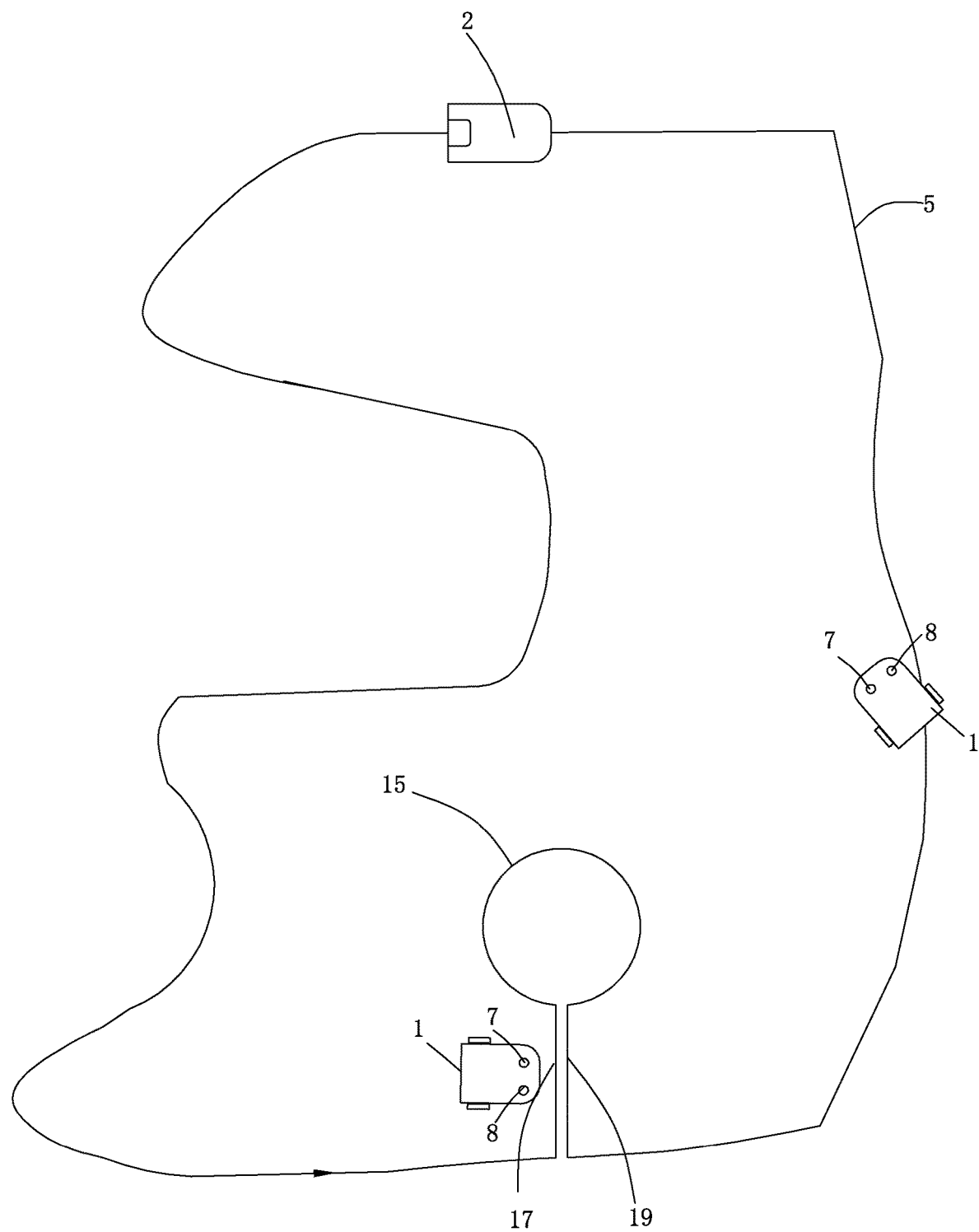
FIG. 8 is a schematic diagram of a working scenario of an automatic working system of the first embodiment of the present invention.

FIG. 8 is a schematic diagram of a working scenario of the automatic working system 100. The working region of the automatic mower 1 comprises an isolation island 15, the boundary wire 5 extends to the isolation island 15 from the boundary of the working region, set around the isolation island 15 and then returns back to the boundary of the working region, in this way, the inner boundary around the isolation island 15 is formed, and the automatic mower 1 is prevented from entering the isolation island 15. Returned portion of the boundary wire 5 is formed between the isolation island 15 and the boundary of the working region, and such portion of the boundary wire 5 comprises a first part 17 and a second part 19 which transmit boundary signal in opposite transmission direction. The boundary signal transmitted by the first part 17 and second part 19 of the returned portion of the boundary wire 5 are same in value and opposite in phase, and if the first part 17 is close to the second part 19 when the boundary wire 5 is paved, then the boundary signal output outputted from the boundary sensor 7 or 8 will not be affected by the boundary signal transmitted by the first part 17 and the second part 19. But, if the first part 17 is away from the second part 19 by a certain distance when the boundary wire 5 is paved, then the boundary sensor 7 or 8 will detect a boundary signal transmitted by the first part 17 and the second part 19. In order that the moving of the automatic mower 1 will not be affected by the returned portion of the boundary wire 5, the preset estimation time is unsuitably to be too short when the automatic mower 1 moves and works in the working region. Specifically, in the present embodiment, when the automatic mower 1 moves and works in the working region, a range of the present estimation time is 60-100 ms (the condition that the type of the boundary signal output is non signal or unknown signal is not considered). If the preset estimation time is too short, when the automatic mower 1 moves to the first part 17 of the returned portion of the boundary wire 5, the estimation unit will finish the wire crossing estimation stage very rapidly, then the control module judges that the automatic mower 1 moves out of the working region, and controls the automatic mower 1 to steer, in this way, the automatic mower 1 cannot cross the returned portion of the boundary wire 5. If the preset estimation time is properly prolonged, when the automatic mower 1 moves to the returned portion of the boundary wire 5, before the estimation unit finishes the wire crossing estimation stage, the automatic mower 1 has already crossed the first part 17 and second part 19 of the returned portion of the boundary wire 5 and moves into the working region again, in this way, when the estimation unit finishes the estimation, the control module will judge the type of the stable boundary signal output to be the inside signal, and thus controls the automatically mower 1 to continue to move and work. Of course, the preset estimation time cannot be too long, if too long, when meeting the boundary wire 5, the automatic mower 1 may move too far away from the boundary wire 5, as a result, accidents such as falling of the automatic mower may occur, specifically, in the preset estimation time, the shell 9 of the automatic mower 1 cannot totally move out of the working region limited by the boundary wire 5 to meet the safety requirements.

Referring to FIG. 8, in the present embodiment, the automatic working system also comprises a charging station 2, which supplies electric energy for the automatic mower 1. When the automatic mower 1 needs to return back to the charging station 2 to be charged, the control module controls the automatic mower 1 to move along the boundary wire 5, more specifically, controls one of the two boundary sensors 7 and 8 to be located in the working region and the other to be located outside the working region. When judging that the boundary sensor 7 or 8 should have been located in the working region moves out of the working region, the control module controls the moving module to drive the automatic mower 1 to steer into the working region; when judging that the boundary sensor 7 or 8 should have been located outside the working region moves into the working region, the control module controls the moving module to drive the automatic mower 1 to steer to the outside of the working region, so as to ensure that the automatic mower 1 moves along the boundary wire 5 to the charging station 2. In the above process, when the boundary sensor 7 or 8 crosses the boundary wire, the control module judges that the type of the boundary signal output outputted by the boundary sensor 7 or 8 is changed, and the estimation unit is triggered to estimate. At this point, if the preset estimation time is too long, then the control module cannot regulate the moving manner of the automatic mower 1 in time, the automatic mower 1 steers after the boundary sensor 7 or 8 has crossed the boundary wire 5 and moves toward by a certain distance, the swing range of the automatic mower 1 is large and the control is inflexible. If the preset estimation time is properly shortened, then the swing range of the automatic mower 1 can be reduced, the returning efficiency of the automatic mower 1 can be improved. Specifically, in the present embodiment, when the automatic mower 1 returns back to the charging station 2 along the boundary wire 5, a range of the preset estimation time may be 40-60 ms.

The estimation process when the automatic mower 1 moves in the working region can be called as slow estimation, and the estimation process when the automatic mower 1 returns to the charging station 2 along the boundary wire 5 can be called as fast estimation. Setting a proper preset estimation time will make the control of the moving manner of the automatic mower 1 accurately and flexible.

Of course, the preset estimation time can be related to moving speed of the automatic mower 1, when the moving speed of the automatic mower 1 is reduced, a moving distance of the automatic mower 1 is reduced under the condition of the unchanged preset estimation time, therefore, the preset estimation time can be prolonged; when the moving speed of the automatic mower 1 is increased, the moving distance of the automatic mower 1 is increased under the condition of the unchanged preset estimation time, and in order to reduce the risk that the automatic mower 1 moves out of the working region, the preset estimation time can be shortened.

In the present embodiment, a consistency parameter of the type the boundary signal output in the preset estimation time can be adjusted, that is, the type of the boundary signal output is determined stable if the probability that the types of the boundary signal output in the preset estimation time are the same reaches a preset value, for example reaches 80%. In this way, even if type of an individual boundary signal output in the preset estimation time is different from others, the boundary signal output can still be considered to be stable.

In the present embodiment, in the sixth stage as shown in FIG. 4, in the steering process of the automatic mower, the boundary sensor 7 may not return back into the working region, for example, the automatic mower 1 meets a slope and slips, when the distance that the automatic mower 1 moves to the outside of the working region is overlarge, this condition can happen. In such condition, the boundary sensor 7 continues to output the outside signal. When the duration time of the steering process of the automatic mower 1 has exceeded a preset value, while the boundary sensor 7 didn't output any inside signal, the control module will control the automatic mower 1 to rotate. If the boundary sensor 7 outputs inside signal in the rotating process, the control module triggers the estimation unit to begin to estimate and enter the seventh stage as shown in FIG. 4: wire crossing estimation. If the boundary sensor 7 still outputs no inside signal in the rotating processing, the control module controls the automatic mower 1 to stop moving and mowing, so as to ensure safety of the automatic working system 100. In the present embodiment, in the moving and working process of the automatic mower 1, when the control module judges that there is no triggered estimation process in a predetermined waiting period, the control module will control the automatic mower 1 to stop moving and mowing. The predetermined waiting period is stopped after the automatic mower 1 moves for a preset distance, a range of the preset distance may be 80-160 mm. The predetermined waiting period can also be stopped after a preset waiting time is up. The reason why control module judges a reason why there is no triggered estimation process in the predetermined waiting period may be that the automatic mower 1 is located outside the working region permanently, or the automatic working system 100 has a fault.

In a second embodiment of the present invention, the estimation process of the estimation unit is basically same as that in the first embodiment, the difference lies in that the predetermined estimation period is stopped after the boundary sensors 7 and 8 outputs a predetermined number of boundary signal output. The estimation unit estimates whether the times that the boundary sensors 7 and 8 continuously output the boundary signal output of the same type reach preset times or not. In the present embodiment, the estimation unit comprises a counter, when the estimation unit begins to estimate, the counter is given an initial count value, every time when the control module judges that the boundary sensors 7 and 8 output a boundary signal output, 1 is added to the count value, or every time when the control module judges that the boundary sensors 7 and 8 output a boundary signal output, 1 is subtracted from the count value; and when the count value is equal to a preset estimation value, the estimation unit finishes the estimation.

Figure 6:
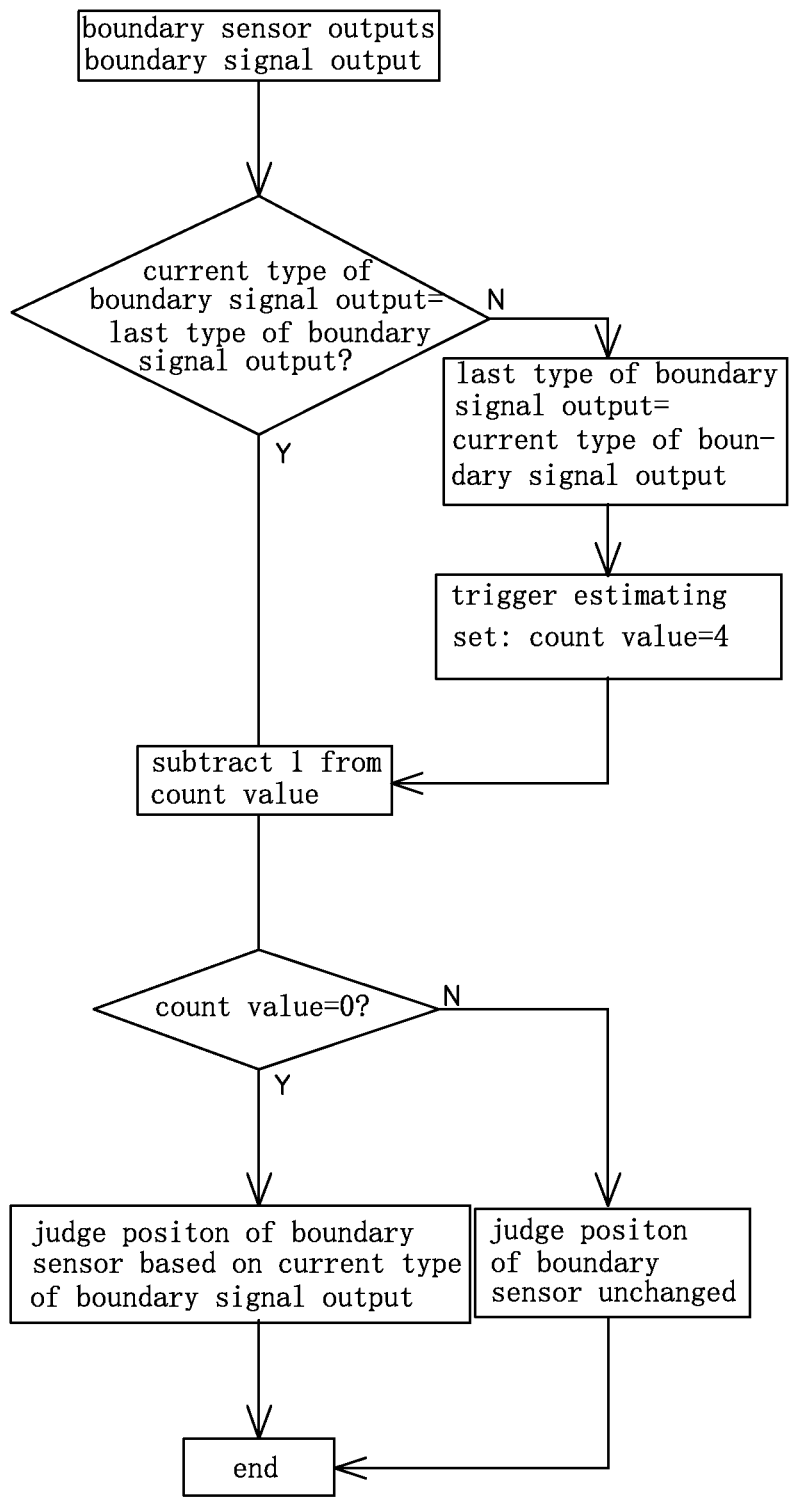
FIG. 6 is an estimation flow chart of a second embodiment of the present invention.

An estimation flow chart shown in FIG. 6 is used as an example for explaining the estimation process of the estimation unit. The estimation process comprises two input parameters: last type of the boundary signal output, set to inside signal by default; and current type of the boundary signal output, i.e., type of the current boundary signal output; an output parameter: position relation of the boundary sensor 7 or 8 relative to the boundary wire 5, set to inside by default.

In the present embodiment, the preset estimation value of the counter is set to be 0, set the count value as the preset estimation value 0 when the automatic mower 1 is started. After the automatic mower 1 is started, every time when the control module judges a boundary signal output is outputted by the boundary sensor 7 and 8, the control module judges whether the current type of the boundary signal output is same as the last type of the boundary signal output, and if not, use the current type of the boundary signal output to replace the last type of the boundary signal output, and the estimation unit is triggered to begin to estimate. If same, then 1 is directly subtracted from the count value, and whether the count value equals to the preset estimation value is judged, if equal, the position relation of the boundary sensors 7 and 8 relative to the boundary wire 5 is judged based on the current type of the boundary signal output; and if not, the position relation of the boundary sensors 7 and 8 relative to the boundary wire 5 is judged to be unchanged.

In the present embodiment, when starting, the automatic mower 1 is located in the working region limited by the boundary wire 5, the boundary signal output outputted from the boundary sensors 7 and 8 is the inside signal, the control module judges that the current type of the boundary signal output is same as the last type (set to inside signal by default) of the boundary signal output, so 1 is subtracted from the count value, the count value is smaller than 0, the control module judges that the position relation of the boundary sensors 7 and 8 relative to the boundary wire 5 is not changed, that is, judges that the boundary sensors 7 and 8 are stilled located in the working region, therefore, the automatic mower 1 is controlled to continue to move and execute the mowing work. When moving in the working region, the automatic mower 1 continues the above judging process.

Referring to FIG. 5(a), in the present embodiment, when the automatic mower 1 moves to boundary wire 5 and continues to move, the boundary sensor 7 moves out of the working region, the control module judges that the current type of the boundary signal output outputted by the boundary sensor 7 is the outside signal, that is to say, the control module judges that the current type of the boundary signal output is different from the last type of the boundary signal output, and thus triggers the estimation unit to begin to estimate and changes value of the last type of the boundary signal output to the outside signal. When the estimation unit begins to estimate, the control module gives the counter an initial count value. In the present embodiment, the control module gives the counter a fixed initial count value, which can be any of a range of 4-10. Every time when the control module judges that the boundary sensor 7 outputs a boundary signal output, comprising the one that triggered estimation unit begins to estimate, 1 is subtracted from the count value. Therefore, when the control module gives the counter the initial count value, 1 is subtracted from the count value. After 1 is subtracted from the count value, the control module judges whether the current count value is equal to the preset estimation value, i.e., judges whether the current count value is subtracted to 0. If the count value is subtracted to 0, then the estimation unit finishes the estimation, the control module judges that the current boundary signal output is stable, and judges the position relation of the boundary sensor 7 relative to the boundary wire 5 based on the current type of the boundary signal output. If the control module judges that the count value is not subtracted to 0, i.e., the estimation unit does not finish estimation, then the position relation of the boundary sensor 7 relative to the boundary wire 5 is judged to be not changed.

In the present embodiment, taking the initial count value as 4 as an example to explain a complete estimation process. The estimation unit begins to estimate, the control module gives the counter the initial count value 4, 1 is subtracted from the count value, the count value is turned into 3, the control module judges that the count value is unequal to the preset estimation value 0, and thus judges that the position relation of the boundary sensor 7 relative to the boundary wire 5 is unchanged. The automatic mower 1 continues to move, the boundary sensor 7 continues to output the outside signal, when judging that the boundary sensor 7 outputs a second outside signal, the control module judges that the current type of the boundary signal output is same as the last type of the boundary signal output, and 1 is directly subtracted from the count value of the counter, the count value is turned into 2, the control module judges that the count value is still unequal to 0, and thus judges that the position relation of the boundary sensor 7 relative to the boundary wire 5 is unchanged, and the estimation process continues. When the control module judges that the boundary sensor 7 outputs a third outside signal, the count value is turned into 1. When the control module judges that the boundary sensor 7 outputs a fourth outside signal, the count value is subtracted to 0, the estimation unit finishes the estimation, the control module judges that the current boundary signal output is stable, and judges that the position of the boundary sensor 7 is changed to outside the working region based on the fact that the current type of the boundary signal output is outside signal. At this point, the control module controls the moving module to drive the automatic mower 1 to steer.

After the automatic mower 1 is steered, the boundary sensor 7 moves into the working region, and a judging process of the control module for the position change of the boundary sensor 7 is similar to the above process.

In the present embodiment, before the estimation unit begins to estimate and after the estimation unit finishes the estimation, every time when the control module judges that the boundary sensors 7 and 8 output an outside signal output, also 1 is subtracted from the count value, and judges whether the count value is equal to the preset estimation value, if not, the position relation of the boundary sensors 7 and 8 relative to the boundary wire 5 is judged to be unchanged. In the present embodiment, either when the automatic mower 1 is started or the estimation unit finishes the estimation, the current count value of the counter is the preset estimation value 0, therefore, when the boundary sensors 7 and 8 output a boundary signal output, 1 is subtracted from the count value, the count value will gradually reduced and always smaller than the preset estimation value, therefore, the control module will always judge that the position relation of the boundary sensors 7 and 8 relative to the boundary wire 5 is unchanged till the control module judges that the current type of the boundary signals output is changed, the estimation unit is triggered to begin to estimate.

In the present embodiment, if the estimation unit does not finish the estimation, that is, the count value is not subtracted to 0, the control module judges that the type of the boundary signal output is changed again, that is, the types of the boundary signals output in the predetermined estimation period are not same, then the estimation unit is triggered to reestimate, and the position relation of the boundary sensors 7 and 8 relative to the boundary wire 5 is judged to be unchanged. In this way, when boundary signal output bounces due to the interference signal, that is, the type of the boundary signal output is temporarily changed, the control module will not immediately judge that the position relation of the boundary sensors 7 and 8 relative to the boundary wire 5 is changed, and only when the times that the boundary sensors 7 and 8 continue to output the boundary signal output of the changed type reach preset times (at least 4 times in the present embodiment), the control module judges that the position relation of the boundary sensor 7 or 8 relative to the boundary wire 5 is changed. Therefore, the misjudgment on the position change of the boundary sensors 7 and 8 due to interference signal and the like is avoided, and the working stability of the automatic mower 1 is improved.

In the present embodiment, every time when the control module judges that the boundary sensors 7 and 8 output a boundary signal output, other values such as 2 and 3 can also be added to or subtracted from the count value of the counter, and the same effect can be achieved as long as the initial count value is correspondingly adjusted. It is understandable that the preset estimation value may be not 0 as long as a difference between the initial count value and the preset estimation value is in a certain range.

In the present embodiment, when the automatic mower 1 works in the working region, when the control module judges that the type of the boundary signal output is changed into inside signal or outside signal, the predetermined estimation period is a period that the boundary sensor 7 or 8 outputs 4-10 boundary signal output. Similar to embodiment 1, the length of the predetermined estimation period can also be adjusted according to the type of the boundary signal output or working mode of the automatic working system 100. When the control module judges that the type of the boundary signal output is changed into non signal or unknown signal, the predetermined estimation period is prolonged, and the predetermined estimation period can be a period that the boundary sensor 7 or 8 outputs 10-30 boundary signal output. When the automatic mower 1 returns back to the charging station 2 along the boundary wire 5, the predetermined estimation period is shortened, and the predetermined estimation period can be a period that the boundary sensor 7 or 8 outputs 2-6 boundary signal output.

In the present embodiment, the condition of judging the boundary signal output is stable may not be that the type of a predetermined number of boundary signal output is continuously same, but the probability that the type of a predetermined number of boundary signal output is the same reaches a preset value.

The present invention is not limited to the listed specific embodiments, and structures and methods based on a concept of the present invention all fall within a protective scope of the present invention.

What is claimed is:

1. An autonomous moving device, moving and working in a working region limited by a boundary wire, comprising:
    at least one boundary sensor, configured to detect boundary signal and output boundary signal output;
    a control module, electrically connected to the boundary sensor, configured to judge type of the boundary signal output outputted by the boundary sensor; and wherein said control module comprises an estimation unit, configured to estimate whether the type of the boundary signal output outputted by the boundary sensor in a predetermined estimation period is consistent or not, and if consistent, the control module judges that the boundary signal output is stable; and wherein the control module triggers the estimation unit to begin to estimate when judging that the type of the boundary signal output outputted by the boundary sensor is changed;
    said control module judges position relation of the boundary sensor relative to the boundary wire based on the type of the stable boundary signal output.

2. The autonomous moving device according to claim 1, wherein if the type of the boundary signal output outputted by the boundary sensor in the predetermined estimation period is inconsistent, said control module judges that the boundary signal output is instable, and makes the estimation unit reestimate.

3. The autonomous moving device according to claim 1, wherein the predetermined estimation period is stopped after preset estimation time is up.

4. The autonomous moving device according to claim 1, wherein the predetermined estimation period is stopped after the boundary sensor outputs a predetermined number of boundary signal output.

5. The autonomous moving device according to claim 1, wherein said estimation unit is configured to estimate whether the type of the boundary signal output outputted by the boundary sensor in the predetermined estimation period is same or not, and if same, the control module judges that the type of the boundary signal output is consistent.

6. The autonomous moving device according to claim 1, wherein the types of the boundary signal output comprise inside signal, or outside signal, or unknown signal, or non signal, wherein the inside signal indicates that the boundary sensor is located in the working region limited by the boundary wire, the outside signal indicates that the boundary sensor is located outside the working region limited by the boundary wire, and the unknown signal indicates that position relation of the boundary sensor relative to the boundary wire is unknown.

7. The autonomous moving device according to claim 6, wherein said autonomous moving device comprises a moving module, electrically connected to the control module, configured to drive said autonomous moving device to move and steer; said control module controls said moving module to drive said autonomous moving device to move forwards when judging that the type of the stable boundary signal output is inside signal.

8. The autonomous moving device according to claim 6, wherein said autonomous moving device comprises a moving module, electrically connected to the control module, configured to drive said autonomous moving device to move and steer; said control module controls said moving module to drive said autonomous moving device to steer when judging that the type of the stable boundary signal output is outside signal.

9. The autonomous moving device according to claim 6, wherein when judging that the type of the stable boundary signal output is unknown signal or non signal, said control module controls the autonomous moving device to stop moving.

10. The autonomous moving device according to claim 6, wherein when the type the boundary signal output estimated by said estimation unit is non signal or unknown signal, the predetermined estimation period is longer than the predetermined estimation period when the type the boundary signal output estimated by said estimation unit is inside signal or outside signal.

11. The autonomous moving device according to claim 1, wherein said autonomous moving device comprises a returning mode, under the returning mode, said control module controls said autonomous moving device to move along the boundary wire; under the returning mode, the predetermined estimation period of the estimation unit is shorter than the predetermined estimation period when said autonomous moving device moves in the working region limited by the boundary wire.

12. The autonomous moving device according to claim 1, wherein if judging that said estimation unit is not triggered to begin to estimate in a predetermined waiting period, said control module controls the autonomous moving device to stop moving.

13. The autonomous moving device according to claim 12, wherein the predetermined waiting period is stopped after said autonomous moving device moves for a preset distance.

14. The autonomous moving device according to claim 1, wherein said estimation unit is configured to estimate position relation of the boundary sensor relative to the boundary wire when said autonomous moving device is started.

15. The autonomous moving device according to claim 14, wherein when said autonomous moving device is started, in the predetermined estimation period, said control module controls said autonomous moving module to not move and not work.

16. The autonomous moving device according to claim 1, wherein said autonomous moving device comprises a returning mode, under the returning mode, said control module controls said autonomous moving device to move along the boundary wire; for said autonomous moving device, under the returning mode or in a working process, in the predetermined estimation period, said control module controls said autonomous moving device to move or work according to a status before said estimation unit begins to estimate.

17. The autonomous moving device according to claim 1, wherein said estimation unit is configured to estimate whether position relation of the boundary sensor relative to the boundary wire is changed.

18. An automatic working system comprising:
a boundary wire capable of transmitting a boundary signal;
at least one boundary sensor configured to detect the boundary signal and output a boundary signal output;
a control module electrically connected to the boundary sensor and configured to judge type of the boundary signal output outputted by the boundary sensor;
wherein said control module comprises an estimation unit configured to estimate whether the type of the boundary signal output outputted by the boundary sensor in a predetermined estimation period is consistent or not, and if consistent, the control module judges that the boundary signal output is stable; and wherein the control module triggers the estimation unit to begin to estimate when judging that the type of the boundary signal output outputted by the boundary sensor is changed; and
wherein said control module judges position relation of the boundary sensor relative to the boundary wire based on whether the boundary signal output is stable.

19. A control method of an autonomous moving device which moves and works in a working region limited by a boundary wire, comprising the steps:
detecting boundary signal, and outputting boundary signal output;
judging type of the boundary signal output;
estimating whether the type of the boundary signal output in a predetermined estimation period is consistent or not, and if consistent, judging that the boundary signal output is stable;
judging position relation of said autonomous moving device relative to the boundary wire based on the type of the stable boundary signal output; and
triggering the estimating when judging the type of boundary signal output outputted is changed.

* * * * *